(No Model.)
A. G. WATERHOUSE.
AUTOMATIC WATER LIFTER.
No. 253,648. Patented Feb. 14, 1882.
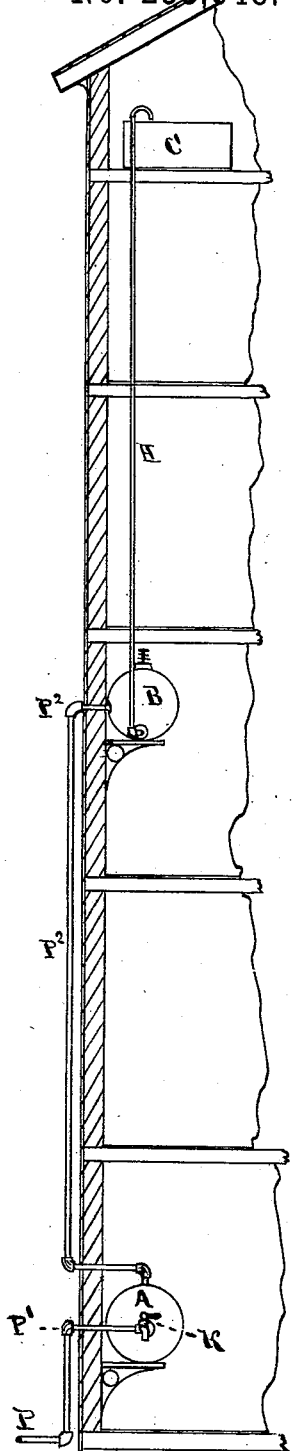
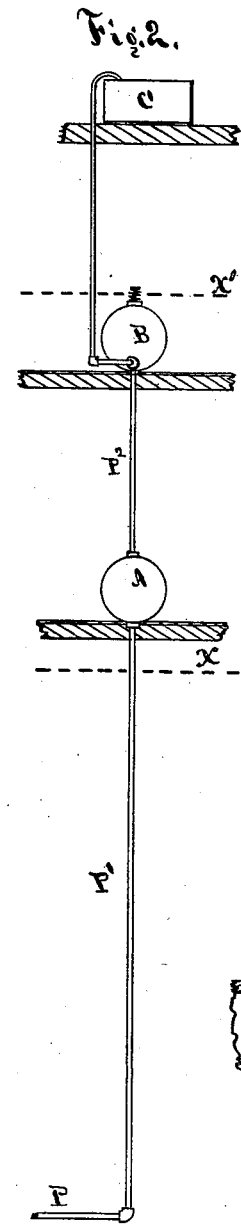
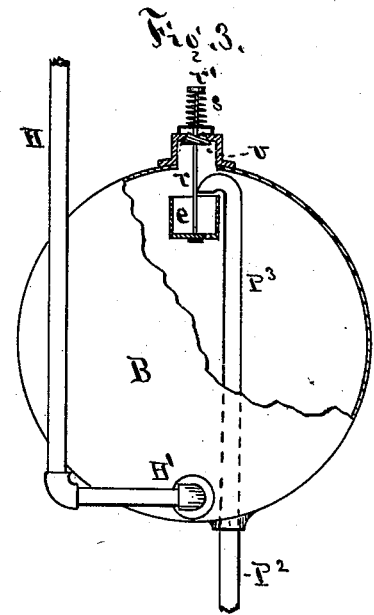
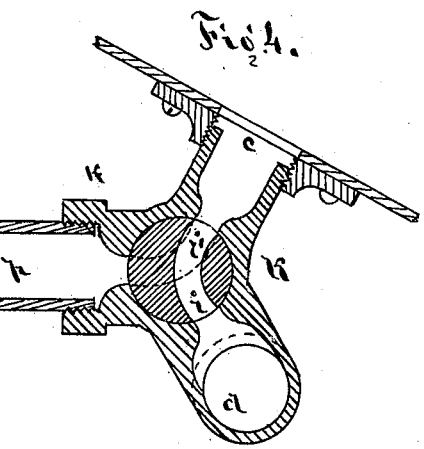
Witnesses
Julian A. Hurdle.
E. H. Garwood
Inventor
Addison G. Waterhouse

UNITED STATES PATENT OFFICE.

ADDISON G. WATERHOUSE, OF NEW YORK, N. Y., ASSIGNOR OF ONE-HALF TO DANIEL A. SCHUYLER, OF SAME PLACE.

AUTOMATIC WATER-LIFTER.

SPECIFICATION forming part of Letters Patent No. 253,648, dated February 14, 1882.

Application filed September 1, 1881. (No model.)

*To all whom it may concern:*

Be it known that I, A. G. WATERHOUSE, of the city and county of New York, State of New York, have invented a new and useful Improvement in Automatic Water-Lifters, of which the following is a specification.

My invention relates to that class of water-lifts in which water under pressure or head is made through the intervention of a column of confined air to raise water to a higher level than that to which the water under pressure would naturally rise.

The object of my invention is to furnish a simple and effective means for causing water supplied under head or pressure to be automatically raised to a higher point than that to which it would naturally rise, through the intervention of a column of confined air, which is automatically interposed between the water under pressure and a body of water contained in a tank at the level to which the water naturally rises, and is alternately and automatically allowed to escape, the arrangement being such that the water contained in the tank from which it is forced to a higher level is supplied from the pipes containing the water under pressure and through the pipes in which the confined body of air is contained when the water in the tank is forced to a higher level.

To this end my invention consists of a certain simplified combination of an elevated relay-tank an automatic air-valve for preventing the egress of air from the top of said tank, or for allowing its ingress at the proper time, a supply-pipe entering said tank at or near its top in constant and free communication with said tank, and connected to the pipe supplying water under pressure, and an exit-pipe opening into the relay-tank at or near its bottom, and leading to an elevated reservoir-tank.

The exact nature of my invention will be readily understood from the following description, taken in conjunction with the annexed drawings, in which—

Figure 1 is a sectional elevation of part of a house, showing the tanks and pipes fixed therein according to my invention. Fig. 2 illustrates a modified plan of carrying out my invention. Fig. 3 is a partial section of the relay-tank, placed at or about the elevation to which the water under pressure naturally rises, and shows, also, a construction of automatic air-valve that may be employed for insuring the opening of the valve to allow ingress of air under the conditions hereinafter described. Fig. 4 is a section of a two-way cock, such as is employed with the arrangement of apparatus shown in Fig. 1.

Referring to Fig. 1, P represents the supply-pipe through which the water under head or pressure is conveyed to the house, and A a tank located on a lower floor, from which tank water is drawn at intervals by means of a two-way cock, K, interposed in the connecting-pipe P', between the supply-pipe P and the tank. The construction of this cock is shown in Fig. 4, where $c$ represents the opening into tank A, $p$ the opening to pipe P', and $d$ the outlet-nozzle of the cock, the plug of which has the curved passage $i\,i'$, so arranged that in one position of the plug the opening $p$ is closed and the nozzle is in free communication with the opening $c$ and tank A for drawing water from A, while in the other position, in which the curved passage $i\,i'$ is represented by the dotted lines, the flow of water through the outlet-nozzle is cut off and a free passage for the water from the supply-pipe P to the tank A is simultaneously provided.

P² represents a pipe which is in constant and free communication with the tank A, and with a relay-tank, B, placed at the level to which the water supplied by pipe P will rise by its natural head or pressure, so that when there is free communication between the supply-pipe P and the tank B the water will rise and fill the tank, if the condition of the air-valve at the top of the tank be at the time such as to allow the air to escape as the tank gradually fills. The pipe P² should open into the tank B at a point near its top, as shown, for instance, in Fig. 3, or at any rate above the water-level line, at which the automatic air-valve in the top of the tank ceases to hold the air-vent closed, and prevent the ingress of air. The necessity for this will appear from the description of the operation.

$v$ represents an automatic air-valve, consisting of a float-valve constructed, when floated, to hold an air-vent in the top of tank B closed, and when allowed to drop by the lowering of the body of water in tank B below its floating-line to open said air-vent and allow the ingress of air. It may also hold the air-vent closed by the internal pressure of confined air in tank B, even when the water falls below the line at which it would naturally float, and so also may be opened by the pressure of external air, even when the water is above the floating-line, if the air in the tank B become rarefied sufficiently. Any properly constructed and balanced float-valve may subserve these functions, as will be readily understood.

C represents a storage-tank placed at a higher level than B, its height above B, of course, depending upon the pressure of the water in the supply-pipe P. Water is supplied to tank C through a constantly-open pipe, H, opening into tank B at or near its bottom.

The operation of the parts as thus constructed and arranged is as follows: Tanks B and A being empty, and the float-valve $v$ being in a depressed position, so that air may escape freely from B, if the cock K be turned so as to open a free passage from the supply-pipe P to the tanks A and B, the water will flow and fill tank A, and will rise and flow into tank B until the water-level in B reaches a point where valve $v$ floats and closes the air-vent. As the tank B is by preference considerably below the level to which the head or pressure in pipe P would naturally carry the water, the water continues to flow into B, but only to the point where the pressure of the confined air in the top of the tank is equal to the pressure of the water-supply at that height. The valve $v$ is then firmly seated, so as to close the air-vent, both by flotation and by the slight pressure of the confined air. If, now, the cock K be turned so as to cut off the water-supply pipe and to draw water from tank A, the water in pipe $P^2$ will recede, thus tending to create a vacuum. The air-pressure in the outside of valve $v$ then becomes sufficient to open the same against the floating power, and air flows in to fill the air-space created by the fall of water in pipe $P^2$ and tank A. When the fall of water-level ceases the valve will immediately close, if properly constructed, by flotation, assisted, if desirable, by a spring, and there will then be a confined body of air between the water in tank A and the water in tank B. When the flow of water from tank A through the cock is shut off, the cock is turned to open a passage between the supply-pipe P and tank A, so that now the head or pressure of water in the supply-pipe acts upon the water in tank B through the interposed column of air and forces the same through the pipe H up and into tank C, and at the same time fills tank A and rises in pipe $P^2$ to a level where the height of the column of water in $P^2$, plus that in H, is equivalent to the pressure or head of the water-supply. The flow and expulsion of water from B then ceases. As will be seen, before this point is reached the water in tank B will have fallen below the floating-level for the float-valve; but the valve is held up and the air-vent kept sealed by the internal air-pressure. When now the cock K is again turned to draw water from A the internal air-pressure will be relieved as the water falls in $P^2$ and A, and the valve $v$ will then drop, so as to open the air-vent and allow egress of air. At the next operation of shutting off the flow of water from A and opening communication with the supply-pipe the water will rise in A and $P^2$, and, expelling the air before it, will flow into tank B and fill the same to the point where the valve again floats and closes the air-vent. As will be readily understood, the water flows into tank B only at every other operation of the cock K. So, also, the water is expelled from tank B at the alternate operations of cock K. It is obviously necessary that the pipe $P^2$ should not open into the relay-tank below the water-level at which the valve floats, because it would then draw the water from tank B and open the valve when water is drawn from tank A, so that at the time when the water-supply should act upon the water in B through a confined body of air it would find the air-vent open and the valve in condition to hold the vent open. Under such conditions it is obvious that water would simply flow into and out of tank B through pipe $P^2$ only.

In Fig. 3 I have shown a form of float-valve that may be employed for the purposes of my invention. This valve is so constructed that while tank B is filling, the flow of the water into the tank tends to keep the valve open, so that the air may be displaced. The float for the valve consists of a bucket, $e$, having a perforation or perforations at its bottom, and provided with a stem, $r$, supported at its upper end upon a compression-spring, $s$, which counterbalances in part, though not wholly, the weight of the bucket, and assists in closing the valve when the bucket is floated.

$P^3$ is a pipe connected with $P^2$, and opening at its upper end over the bucket, so that the water flowing through the same will fall into the bucket and keep the valve open until the water rises to a point where the bucket will float. When the water is expelled from tank B by the air-pressure acting upon the surface of the water the water in the bucket flows out through the perforation in its bottom, thus relieving the valve of its weight, so that the valve does not open. When, however, after the water has fallen below the float-line and the internal air-pressure ceases the weight of the bucket is sufficient to open the valve.

Fig. 2 shows the manner in which I apply my invention where there is a varying pressure in the supply-pipes, caused by the drawing of water in other parts of the same building from time to time, or where the pressure or head of water fluctuates from other causes. In this case the level of the water is supposed to fluctuate from X to X', the line X' indicating its highest level. As the water falls to X air is drawn into the space created through the float-valve in top of B, and as it again rises it expels the water in B through a pipe leading to tank C, in the manner before described in connection with Fig. 1. As the water again falls the valve opens by its own gravity, and remains open, so that at the next fluctuation of pressure raising the water to height represented by X the water can expel the air before it and again fill tank B to the floating-level of the valve.

I do not desire to limit myself to any particular construction of automatic float-valve, nor to any particular construction of a two-way cock, as these may be varied in many ways.

It is obvious that two single-way cocks may be used instead of the double-way cock described.

What I claim as my invention is—

1. The combination, substantially as described, for an automatic water-lifting apparatus, of a relay-tank placed at or near the level to which the water naturally rises, a pipe opening into said tank at or near its top, and having free and constant communication therewith, as described, an automatic air-valve in the top of the tank, and a pipe connected with the tank at or near its bottom and leading to a reservoir-tank.

2. The combination, substantially as described, of relay-tank B, pipe $P^2$, in constant and free communication therewith at or near its top, so that it may either supply water thereto or may receive air therefrom introduced into said tank through an automatic air-valve at its top, an automatic air-valve for said tank controlling an air-vent, a supply-tank, A, and a two-way cock, K.

3. The combination, substantially as described, of the relay-tank provided with automatic air-vent, pipe $P^2$, in free and constant communication with said tank at or near its top, supply-tank A, means for connecting and disconnecting said tank with the pipes supplying water under pressure and for drawing water from said tank, and outlet-pipe opening into the relay-tank at or near its bottom and leading to a storage-tank.

ADDISON G. WATERHOUSE.

Witnesses:
JULIAN A. HURDLE,
E. H. GARWOOD.